United States Patent
Han et al.

(10) Patent No.: US 7,662,448 B2
(45) Date of Patent: Feb. 16, 2010

(54) PHOTOSENSITIVE RESIN COMPOSITION FOR COLUMN SPACERS FOR LIQUID CRYSTAL DISPLAY DEVICE, COLUMN SPACERS FORMED USING THE COMPOSITION AND DISPLAY DEVICE COMPRISING THE COLUMN SPACERS

(75) Inventors: Jae Sun Han, Suwon-si (KR); Jeong Min Hong, Daegu-si (KR); Jung Sik Choi, Seoul-si (KR); Kil Sung Lee, Gwacheon-si (KR)

(73) Assignee: Cheil Industries Inc., Gumi-si (KR)

( * ) Notice: Subject to any disclaimer, the term of this patent is extended or adjusted under 35 U.S.C. 154(b) by 238 days.

(21) Appl. No.: 11/953,124

(22) Filed: Dec. 10, 2007

(65) Prior Publication Data

US 2008/0146694 A1    Jun. 19, 2008

(30) Foreign Application Priority Data

Dec. 14, 2006    (KR)    ........................ 10-2006-0128075

(51) Int. Cl.
*C08F 2/46*    (2006.01)
*G02F 1/13*    (2006.01)
*G02F 1/339*    (2006.01)

(52) U.S. Cl. .................... 428/1.55; 428/1.1; 430/281.1; 430/287.1; 522/121; 522/79

(58) Field of Classification Search .................. 428/1.1, 428/1.55; 522/79, 121; 430/281.1, 286.1, 430/287.1
See application file for complete search history.

(56) References Cited

U.S. PATENT DOCUMENTS

| | | | | |
|---|---|---|---|---|
| 4,996,134 | A | * | 2/1991 | Enyo et al. ............... 430/286.1 |
| 5,399,604 | A | * | 3/1995 | Sano et al. ................... 524/356 |
| 5,847,015 | A | * | 12/1998 | Tajima et al. ................. 522/75 |
| 7,247,659 | B2 | * | 7/2007 | Kura et al. .................... 522/12 |
| 7,399,574 | B2 | * | 7/2008 | Hayashi et al. .......... 430/287.1 |
| 7,537,810 | B2 | * | 5/2009 | Hayashi et al. .............. 428/1.1 |
| 7,556,910 | B2 | * | 7/2009 | Kim et al. ................. 430/270.1 |

FOREIGN PATENT DOCUMENTS

KR    10-0268697 B1    7/2000

* cited by examiner

*Primary Examiner*—Susan W Berman
(74) *Attorney, Agent, or Firm*—Summa, Additon & Ashe, P.A.

(57) ABSTRACT

A photosensitive resin composition for forming column spacers for a liquid crystal display device is provided. The composition includes an alkali-soluble resin, a reactive unsaturated compound, a photoinitiator and a solvent. The alkali-soluble resin includes structural units represented by Formulae 1, 2 and 3, which are described in the specification. A pattern formed using the composition is also provided. The pattern shows improved thickness uniformity, good developability without leaving any residual image, superior solvent resistance and high recovery rate.

11 Claims, 1 Drawing Sheet

【FIG. 1】
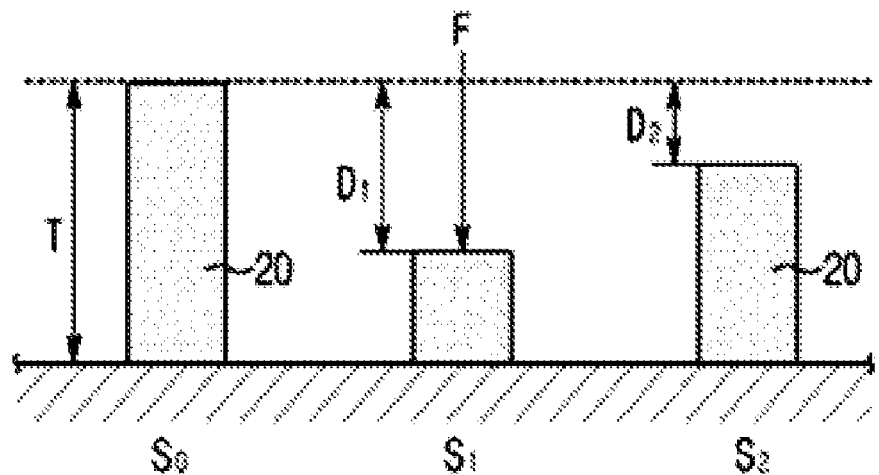
【FIG. 2】
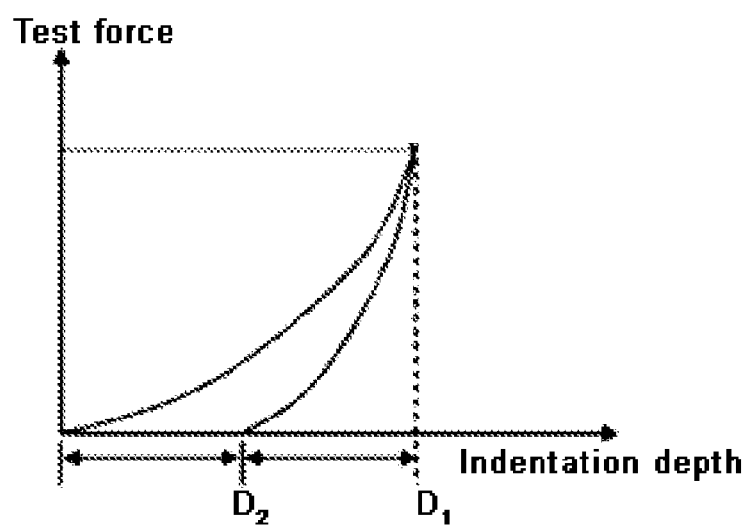

PHOTOSENSITIVE RESIN COMPOSITION FOR COLUMN SPACERS FOR LIQUID CRYSTAL DISPLAY DEVICE, COLUMN SPACERS FORMED USING THE COMPOSITION AND DISPLAY DEVICE COMPRISING THE COLUMN SPACERS

CROSS-REFERENCE TO RELATED APPLICATION

This non-provisional application claims priority under 35 USC Section 119 from Korean Patent Application No. 10-2006-0128075 filed on Dec. 14, 2006, which is hereby incorporated by reference in its entirety.

FIELD OF THE INVENTION

The present invention relates to a photosensitive resin composition for column spacers for a liquid crystal display device and column spacers formed therewith.

BACKGROUND OF THE INVENTION

A liquid crystal display device can use spherical or cylindrical silica or plastic beads to maintain a constant interval between upper and lower panels. Since the beads are randomly applied to and distributed on a glass substrate, they may be located within active pixels. In this case, the contrast ratio of the liquid crystal display device is lowered due to decreased opening ratio of the liquid crystal display device and light leakage (a phenomenon in which light is emitted in directions other than the forward direction).

To solve these problems, spacers have been formed by photolithography. According to this method, a photosensitive resin composition is applied to a glass substrate, and the photosensitive resin composition is irradiated with UV light through a patterned mask. The exposed portions of the photosensitive resin composition are developed to form spacers according to the pattern of the mask on desired areas of the glass substrate other than within active pixels. However, the spacers have poor processing stability, low compressive displacement and low recovery rate. Thus a layer underlying R, G and B pixels of a color filter of a liquid crystal display device can be abnormally deformed to form gap defects between or within the respective pixels. This problem leads to color or contrast defects, which can deteriorate the quality of images.

Various attempts have been made to solve the above problems. For example, Korean Patent Registration No. 10-0268697 teaches a use of a copolymer comprising a conjugated unsaturated diolefinic compound as a binder resin to achieve high strength and recovery rate.

However, synthesis of copolymers including 1,3-butadiene as a structural unit, which is mainly used to achieve increased elastic recovery, requires the use of a high-pressure reactor and it can be difficult to control the content of 1,3-butadiene due to its low reactivity. Thus, there is an increasing demand to develop a binder that exhibits characteristics comparable to copolymers using 1,3-butadiene and can be easily synthesized.

On the other hand, recent trends towards the use of large substrates have brought about an increase in exposure time during the formation of column spacers using photo-curable resist compositions, resulting in a reduction in productivity. In view of the foregoing, there is a need in the art to develop a resist composition for column spacers for a liquid crystal display device with a high productivity.

SUMMARY OF THE INVENTION

The present invention can provide a photosensitive resin composition useful for column spacers for a liquid crystal display device that show improved after-pattern thickness uniformity, high sensitivity, good developability without leaving any residual image, superior solvent resistance and high recovery rate, as well as processing stability and strength. The present invention can further provide column spacers for a liquid crystal display device which are formed using the photosensitive resin composition.

In accordance with one aspect of the present invention, there is provided a photosensitive resin composition comprising an alkali-soluble resin, a reactive unsaturated compound, a photoinitiator and a solvent, wherein the alkali-soluble resin is a copolymer including structural units represented by Formulae 1, 2 and 3:

(1)

wherein $R_1$ and $R_2$ are each independently a hydrogen atom or a $C_1$-$C_6$ alkyl group;

(2)

wherein $R_1$ and $R_2$ are each independently a hydrogen atom or a $C_1$-$C_6$ alkyl group, and $R_3$ is selected from $C_1$-$C_{12}$ alkyl, hydroxyalkyl, amide- or urea-containing alkyl, alkenyl, $C_5$-$C_{12}$ cycloalkyl which is optionally substituted with a group selected from methyl or $C_1$-$C_4$ oxyalkyl, aromatic hydrocarbon and polycyclic alkyl groups; and

(3)

wherein $R_1$ and $R_2$ are each independently a hydrogen atom or a $C_1$-$C_6$ alkyl group and $R_4$ is a linear dienic polymer having unsaturated double bonds.

In accordance with another aspect of the present invention, there are provided column spacers for a liquid crystal display device which are formed using the photosensitive resin composition.

In accordance with still another aspect of the present invention, there is provided a liquid crystal display device using the column spacers.

BRIEF DESCRIPTION OF THE DRAWINGS

FIG. 1 is a diagram showing deformation of a column spacer when a force is applied to the column spacer; and FIG. 2 is a graph showing a relationship between the compressive displacement and recovery rate of a column spacer.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The photosensitive resin composition of the present invention includes an alkali-soluble resin that is a copolymer having structural units represented by Formulae 1, 2 and 3:

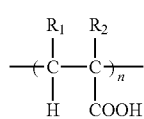

(1)

wherein $R_1$ and $R_2$ are each independently a hydrogen atom or a $C_1$-$C_6$ alkyl group and n represents the weight ratio of the structural unit to the copolymer;

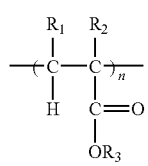

(2)

wherein $R_1$ and $R_2$ are each independently a hydrogen atom or a $C_1$-$C_6$ alkyl group, $R_3$ is selected from $C_1$-$C_{12}$ alkyl, hydroxyalkyl, amide- or urea-containing alkyl, alkenyl, $C_5$-$C_{12}$ cycloalkyl which is optionally substituted with a group selected from methyl or $C_1$-$C_4$ oxyalkyl, aromatic hydrocarbon and polycyclic alkyl groups, and n represents the weight ratio of the structural unit to the copolymer; and

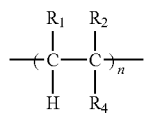

(3)

wherein $R_1$ and $R_2$ are each independently a hydrogen atom or a $C_1$-$C_6$ alkyl group, $R_4$ is a linear dienic polymer having unsaturated double bonds, and n represents the weight ratio of the structural unit to the copolymer.

In Formulae 1, 2 and 3, each n represents the weight ratio of the corresponding structural unit to the copolymer.

As used herein, the term hydroxyalkyl can include $C_1$-$C_{20}$ hydroxyalkyl, the term amide- or urea-containing alkyl can include $C_1$-$C_{20}$ amide- or urea-containing alkyl, the term alkenyl can include $C_1$-$C_{20}$ alkenyl, the term aromatic hydrocarbon can include $C_6$-$C_{20}$ aromatic hydrocarbon and the term polycyclic alkyl groups can include $C_3$-$C_{20}$ polycyclic alkyl groups.

The copolymer may be a random, alternating, block or graft copolymer. Graft copolymers can provide advantages with regard to compressive displacement and recovery rate. The copolymer imparts sufficient curability to a coating film to be formed using the photosensitive resin composition at a low exposure dose.

The structural unit of Formula 1 may be derived from at least one carboxylic acid compound selected from the group consisting of acrylic acid, methacrylic acid, ethacrylic acid, crotonic acid, 2-pentenoic acid, and the like and mixtures thereof. Acrylic acid and methacrylic acid can provide high copolymerization reactivity and excellent heat resistance and are readily commercially available.

The alkali-soluble resin can include the structural unit of Formula 1 in an amount of about 10 to about 60% by weight, based on the total weight of the alkali-soluble resin. When the alkali-soluble resin includes the structural unit of Formula 1 in an amount of less than about 10% by weight, the solubility of the alkali-soluble resin in an aqueous alkaline solution tends to decrease, leaving residue in the solution. Meanwhile, when the alkali-soluble resin includes the structural unit of Formula 1 in an amount of more than about 60% by weight, the solubility of the alkali-soluble resin in an aqueous alkaline solution may be too high to form a pattern.

The structural unit of Formula 2 may be derived from at least one (meth)acrylic acid ester selected from the group consisting of methyl(meth)acrylate, ethyl(meth)acrylate, butyl(meth)acrylate, 2-ethylhexyl(meth)acrylate, phenyl(meth)acrylate, cyclohexyl(meth)acrylate, dicyclopentanyl(meth)acrylate, dicyclopentanyloxyethyl(meth)acrylate, isobornyl(meth)acrylate, benzyl(meth)acrylate, phenylethyl(meth)acrylate, and the like and mixtures thereof.

The alkali-soluble resin can include the structural unit of Formula 2 in an amount of about 20 to about 60% by weight, based on the total weight of the alkali-soluble resin. When the alkali-soluble resin includes the structural unit of Formula 2 in an amount of less than about 20% by weight, the composition may have low adhesiveness, and column spacers formed using the composition may suffer from low strength. Meanwhile, when the alkali-soluble resin includes the structural unit of Formula 2 in an amount of more than about 60% by weight, the developability of the composition may be deteriorated.

The structural unit of Formula 3 may be prepared by reaction of at least one acrylonitrile compound selected from the group consisting of acrylonitrile, methacrylonitrile, ethacrylonitrile, n-propylacrylonitrile, i-propylacrylonitrile, and the like, and mixtures thereof, with at least one pendant polymer selected from diene polymers such as butadiene, pentadiene, and the like, and mixtures thereof.

The alkali-soluble resin can include the structural unit of Formula 3 in an amount of about 3 to about 20% by weight, based on the total weight of the alkali-soluble resin. When the alkali-soluble resin includes the structural unit of Formula 3 in an amount of less than about 3% by weight, there may be problems of low compressive displacement, recovery rate and sensitivity. Meanwhile, when the alkali-soluble resin includes the structural unit of Formula 3 in an amount of more than about 20% by weight, the developability of the composition tends to deteriorate.

In addition to the structural units of Formulae 1, 2 and 3, the alkali-soluble resin may further include a structural unit derived from a styrene compound selected from the group consisting of styrene, α-methylstyrene, m-methylstyrene, p-methylstyrene, vinyltoluene, p-methoxystyrene, p-tert-butoxystyrene; and the like and mixtures thereof.

The alkali-soluble resin can be prepared by radical-polymerizing the selected compounds in a solvent in the presence of a polymerization initiator as a catalyst.

Examples of suitable solvents useful in the present invention include without limitation: alcohols, such as methanol and ethanol; ethers, such as tetrahydrofuran; cellosolve esters, such as methyl cellosolve acetate; aromatic hydrocarbons; ketones; and esters, and the like, and mixtures thereof.

Any known radical polymerization catalyst in the art may be used for the radical polymerization. Examples of suitable radical polymerization catalysts include without limitation: azo compounds such as 2,2-azobisisobutyronitrile, 2,2-azobis-(2,4-dimethylvaleronitrile) and 2,2-azobis-(4-methoxy-2,4-dimethylvaleronitrile); organic peroxides such as benzoyl peroxide, lauroyl peroxide, t-butylperoxypivalate and 1,1'-bis-(t-butylperoxy)cyclohexane; and hydrogen peroxide; and the like, and mixtures thereof. When a peroxide is used as the radical polymerization initiator, a combination of the peroxide with a reducing agent may be used as a redox initiator.

The molecular weight and the molecular weight distribution of the copolymer are not particularly limited so long as the composition of the present invention can be uniformly applied.

The alkali-soluble resin can have a structure of Formula 4:

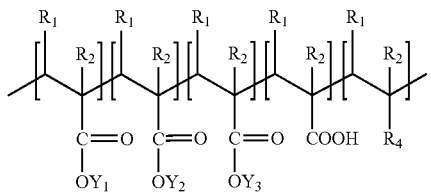

wherein $R_1$ and $R_2$ are each independently a hydrogen atom or a $C_1$-$C_6$ alkyl group, $Y_1$ is a $C_1$-$C_{12}$ alkyl group, a hydroxyalkyl group, an amide- or urea-containing alkyl group, or an alkenyl group; $Y_2$ is a $C_5$-$C_{12}$ cycloalkyl which is optionally substituted with a group selected from methyl or $C_1$-$C_4$ oxyalkyl or aromatic hydrocarbon group (e.g., a benzene, phenyl or naphthyl group), $Y_3$ is a polycyclic alkyl group, and $R_4$ is a linear dienic polymer having unsaturated double bonds.

The alkali-soluble resin can be present in the composition of the invention an amount of about 5% to about 50% by weight, for example about 10% to about 25% by weight, based on the total weight of the composition. The use of the alkali-soluble resin in an amount smaller than about 5% by weight may cause poor developability of the composition. Meanwhile, the use of the alkali-soluble resin in an amount greater than about 50% by weight may make it difficult to form a pattern using the composition. The alkali-soluble resin can have a dispersity of between about 1.2 and about 5.

The reactive unsaturated compound is a polymerizable compound having at least one ethylenically unsaturated double bond, such as those used in conventional photosensitive compositions. Examples of reactive unsaturated compounds suitable for use in the present invention include without limitation the following compounds: esterification products of α,β-unsaturated carboxylic acids and polyhydric alcohols such as ethylene glycol di(meth)acrylate, polyethylene glycol di(meth)acrylate having 2 to 14 ethylene oxide units, trimethylolpropane di(meth)acrylate, trimethylolpropane tri(meth)acrylate, pentaerythritol tri(meth)acrylate, pentaerythritol tetra(meth)acrylate, propylene glycol di(meth)acrylate having 2 to 14 propylene oxide units, dipentaerythritol penta(meth)acrylate, dipentaerythritol hexa(meth)acrylate; adducts of (meth)acrylic acid with glycidyl group-containing compounds such as trimethylolpropane triglycidyl ether acrylic acid adducts and bisphenol A diglycidyl ether acrylic acid adducts; esterification products of polyhydric carboxylic acids or adducts of polyisocyanates with compounds having both hydroxide groups and ethylenically unsaturated bonds, e.g., phthalic acid diesters of β-hydroxyethyl (meth)acrylate and toluene diisocyanate adducts of β-hydroxyethyl (meth)acrylate; and alkyl (meth)acrylates such as methyl (meth)acrylate, ethyl (meth)acrylate, butyl (meth)acrylate and 2-ethylhexyl (meth)acrylate. As other polymerizable compounds, there may be mentioned, for example, ditrimethylolpropane tetraacrylate, tris(2-acryloxyethyl)isocyanurate, ethoxylated pentaerythritol tetraacrylate (EO 4 mol), pentaerythritol tetraacrylate (EO 35 mol), ethoxylated trimethylolpropane triacrylate (EO 9 mol), ethoxylated trimethylolpropane triacrylate (EO 3 mol), propoxylated pentaerythritol tetraacrylate (PO 4 mol), nonaethylene glycol diacrylate, caprolactone-modified dipentaerythritol hexaacrylate, and propoxylated trimethylolpropane triacrylate. These polymerizable compounds may be used alone or as a mixture of two or more thereof.

The reactive unsaturated compound can be present in the composition of the invention in an amount of about 1 to about 50% by weight, for example, about 3 to about 30% by weight, based on the total weight of the composition. The use of the reactive unsaturated compound in an amount less than about 1% by weight may deteriorate the sensitivity of the composition in the presence of oxygen and may make it difficult to form column spacers using the composition. Meanwhile, the use of the reactive unsaturated compound in an amount more than about 50% by weight may deteriorate compatibility with the copolymer and roughened the surface of a coating film.

Any conventional photoinitiator may be used in the present invention. A colored photoinitiator may deteriorate the transparency of the composition. A composition of an optimal sensitivity in a specific wavelength region and a transparent photoinitiator allows high transparency of the composition. Generally, photoinitiators used for the crosslinking reactions of acrylic multifunctional monomers is selected depending on the wavelength of UV light used. The composition of the present invention uses a photoinitiator that generates radicals in the ultraviolet region. Examples of radical polymerization photoinitiators suitable for use in the present invention include without limitation O-acyloxime polymerization initiators (I) such as 1-[9-ethyl-6-benzoyl-9H-carbazol-3-yl]-nonane-1,2-nonane-2-oxime-O-benzoate, 1-[9-ethyl-6-benzoyl-9H-carbazol-3-yl]-nonane-1,2-nonane-2-oxime-O-acetate, 1-[9-ethyl-6-benzoyl-9H-carbazol-3-yl]-pentane-1,2-pentane-2-oxime-O-acetate, 1-[9-ethyl-6-benzoyl-9H-carbazol-3 -yl]-octan-1-one oxime-O-acetate, 1-[9-ethyl-6-(2-methylbenzoyl)-9H-carbazol-3-yl]-ethan-1-one oxime-O-benzoate, 1-[9-ethyl-6-(2-methylbenzoyl)-9H-carbazol-3-yl]-ethan-1-one oxime-O-acetate, 1-[9-ethyl-6-(1,3,5-trimethylbenzoyl)-9H-carbazol-3-yl]-ethan-1-one oxime-O-benzoate and 1-[9-butyl-6-(2-ethylbenzoyl)-9H-carbazol-3-yl]-ethan-1-one oxime-O-benzoate; and O-acyloxime polymerization initiators (II) such as 1,2-octadione-1-[4-(phenylthio)phenyl]-2-(O-benzoyloxime), 1,2-butanedione-1-[4-(phenylthio)phenyl]-2-(O-benzoyloxime), 1,2-butanedione-1-[4-(phenylthio)phenyl]-2-(O-acetyloxime), 1,2-octadione-1-[4-(methylthio)phenyl]-2-(O-benzoyloxime) and 1,2-octadione-1-[4-(phenylthio)phenyl]-2-(O-(4-methylbenzoyloxime)), and the like, and mixtures thereof Examples of other polymerization initiators include without limitation: α-diketones such as benzyl and diacetyl; acyloins, such as benzoin; acyloin ethers such as benzoin methyl ether, benzoin ethyl ether and benzoin isopropyl ether; benzophenones such as thioxanthone, 2,4-diethylthioxanthone, thioxanthone-4-sulfonic acid, benzophenone, 4,4'-bis(dimethylamino)benzophenone and 4,4'-bis(diethylamino) benzophenone; acetophenones such as acetophenone, p-dimethylaminoacetophenone, α,α'-dimethoxyacetoxybenzophenone, 2,2'-dimethoxy-2-phenylacetophenone, p-methoxyacetophenone, 2-methyl-[4-(methylthio)phenyl]-2-morpholino-1-propane and 2-benzyl-2-dimethylamino-1-(4-morpholinophenyl)-butan-1-one; quinones such as anthraquinone and 1,4-naphthoquinone; halides such as phenacyl chloride, tribromomethylphenylsulfone and tris (trichloromethyl)-s-triazine; peroxides such as di-t-butyl peroxide; and acylphosphine oxides such as 2,4,6-trimethylbenzoyldiphenylphosphine oxide; and the like, and mixtures thereof.

When exposed to light in the presence of oxygen, some radical photoinitiators may show low photosensitivity, and as a result, the residual film rate and hardness of exposed portions may be unsatisfactory. Accordingly, the following photopolymerization initiators may be advantageous for use in polymerizations performed in the presence of oxygen: (1) all cationic photopolymerization initiators (there is no substantial decrease in the sensitivity of reactive species by oxygen); and (2) some radical photopolymerization initiators, including acetophenones, e.g., 2-methyl-[4-(methylthio)phenyl]-2-morpholino-1-propane and 2-benzyl-2-dimethylamino-1-(4-morpholinophenyl)-1-butan-1-one; halides, e.g., phenacyl chloride, tribromomethylphenylsulfone and tris(trichloromethyl)-s-triazine; acylphosphine oxides, e.g. 2,4,6-trimethylbenzoyldiphenylphosphine oxide; and O-acyloximes, e.g., 1-[9-ethyl-6-(2-methylbenzoyl)-9H-carbazol-3-yl]-ethan-1-one oxime-O-acetate and 1,2-octadione-1-[4-(phenylthio) phenyl]-2-(O-benzoyloxime), and the like and mixtures thereof.

The photoinitiator is present in the composition in an amount of about 0.5 to about 15% by weight, based on the total weight of the composition. When the content of the photoinitiator is less than about 0.5% by weight, the sensitivity of radicals tends to drop due to the presence of oxygen. Meanwhile, when the content of the photoinitiator is more than about 15% by weight, the color density of the solution may be increased or some of the photoinitiators may settle down. Further, the radical photopolymerization initiator may be used in combination with a cationic photopolymerization initiator or a photosensitizer.

Any organic solvent that is unreactive and compatible with the copolymer, the multifunctional monomers, the photoinitiator and other compounds of the domposition may be used in the present invention.

Examples of such solvents include without limitation: alcohols, such as methanol and ethanol; ethers such as dichloroethyl ether, n-butyl ether, diisoamyl ether, methyl phenyl ether and tetrahydrofuran; glycol ethers such as ethylene glycol monomethyl ether and ethylene glycol monoethyl ether; cellosolve acetates such as methyl cellosolve acetate, ethyl cellosolve acetate and diethyl cellosolve acetate; carbitols such as methyl ethyl carbitol, diethyl carbitol, diethylene glycol monomethyl ether, diethylene glycol monoethyl ether, diethylene glycol dimethyl ether, diethylene glycol methyl ethyl ether and diethylene glycol diethyl ether; propylene glycol alkyl ether acetates such as propylene glycol methyl ether acetate and propylene glycol propyl ether acetate; aromatic hydrocarbons such as toluene and xylene; ketones such as methyl ethyl ketone, cyclohexanone, 4-hydroxy-4-methyl-2-pentanone, methyl-n-propyl ketone, methyl-n-butyl ketone, methyl-n-amyl ketone and 2-heptanone; saturated aliphatic monocarboxylic acid alkyl esters such as ethyl acetate, n-butyl acetate and isobutyl acetate; lactates such as methyl lactate and ethyl lactate; alkyl oxyacetates such as methyl oxyacetate, ethyl oxyacetate and butyl oxyacetate; alkyl alkoxyacetates such as methyl methoxyacetate, ethyl methoxyacetate, butyl methoxyacetate, methyl ethoxyacetate and ethyl ethoxyacetate; alkyl 3-oxypropionates, such as methyl 3-oxypropionate and ethyl 3-oxypropionate; alkyl 3-alkoxypropionates such as methyl 3-methoxyproplonate, ethyl 3-methoxypropionate, ethyl 3-ethoxypropionate and methyl 3-ethoxypropionate; alkyl 2-oxypropionates such as methyl 2-oxypropionate, ethyl 2-oxypropionate and propyl 2-oxypropionate; alkyl 2-alkoxypropionates such as methyl 2-methoxypropionate, ethyl 2-methoxypropionate, ethyl 2-ethoxypropionate and methyl 2-ethoxypropionate; 2-oxy-2-methylpropionic acid esters such as methyl 2-oxy-2-methylpropionate and ethyl 2-oxy-2-methylpropionate; alkyl monooxymonocarboxylic acid esters of alkyl 2-alkoxy-2-methyl propionates such as methyl 2-methoxy-2-methylpropionate and ethyl 2-ethoxy-2-methylpropionate; esters such as ethyl 2-hydroxypropionate, ethyl 2-hydroxy-2-methylpropionate, ethyl hydroxyacetate and methyl 2-hydroxy-3-methylbutanoate; ketonic acid esters such as ethyl pyruvate; and high-boiling solvents such as N-methylformamide, N,N-dimethylformamide, N-methylformanilide, N-methylacetamide, N,N-dimethylacetamide, N-methylpyrrolidone, dimethylsulfoxide, benzyl ethyl ether, dihexyl ether, acetonylacetone, isophorone, caproic acid, caprylic acid, 1-octanol, 1-nonanol, benzyl alcohol, benzyl acetate, ethyl benzoate, diethyl oxalate, diethyl maleate, γ-butyrolactone, ethylene carbonate, propylene carbonate and phenyl cellosolve acetate; and the like. These solvents may be used alone or as a mixture of two or more thereof. The solvent can added to the composition in an amount selected so that the viscosity of the photosensitive resin composition is in the range of about 3 to about 40 cps, for example, about 5 to about 30 cps. The photosensitive resin composition having a viscosity of about 5 to about 30 cps can be advantageous in production of a coating layer in which no pinholes are observed after coating and by which a cell gap can be maintained at a thickness of about 2 to about 10 μm.

If necessary, the photosensitive resin composition of the present invention may further comprise a silane coupling agent to improve the adhesion of the composition to a substrate. The silane coupling agent has at least one reactive substituent selected from carboxyl, methacryloyl, isocyanate or epoxy group. Specific examples of the silane coupling agent include without limitation trimethoxysilylbenzoic acid, γ-methacryloxypropyltrimethoxysilane, vinyltriacetoxysilane, vinyltrimethoxysilane, γ-isocyanatopropyltriethoxysilane, γ-glycidoxypropyltrimethoxysilane, and β-(3,4-epoxycylcohexyl)ethyltrimethoxysilane. These coupling agents may be used alone or in a combination thereof.

The silane coupling agent can be present in the composition of the invention in an amount of about 0.001 to about 20 parts by weight, based on 100 parts by weight of the alkali-soluble resin.

If necessary, the photosensitive resin composition of the present invention may further comprise one or more known additives that are compatible with the components of the composition. Such additives can include without limitation photosensitizing agents, thermal polymerization inhibitors, defoaming agents, and leveling agents, and the like and mixtures thereof.

The photosensitive resin composition of the present invention can be used to form column spacers for a liquid crystal display device. The formation procedure can be as follows.

1. Application and Formation of Coating Film

The photosensitive resin composition of the present invention is applied in an intended thickness (e.g., about 2 to about 5 μm) to a pretreated substrate by spin coating, slit coating or roll coating, or using an applicator. The coated substrate is heated at about 70 to about 90° C. for about 1 to about 10 minutes to remove the solvent. As a result, a coating film is formed on the substrate.

2. Light Exposure

A mask having a predetermined pattern is placed on the coating film. The coating film is irradiated with actinic rays of 200-500 nm through the mask. A low-pressure mercury lamp, a high-pressure mercury lamp, an ultrahigh-pressure mercury lamp, a metal halide lamp or an argon gas laser can be used as a light source for irradiation. X-rays and electron beams may also be used for the irradiation.

The exposure dose may vary depending upon the types of components present in the composition, the amount of each component and the intended thickness of a dry film. If a high-pressure mercury lamp is used, the exposure dose is below 300 mJ/cm$^2$ (as measured by a 365-nm sensor).

3. Development

The exposed coating film is developed with a developer to dissolve and remove unnecessary portions and leave the exposed portions. As a result, a pattern is formed on the substrate.

4. Post-treatment

The developed coating film can be cured by heating or irradiating the image pattern with actinic rays to impart heat resistance, light resistance, adhesiveness, crack resistance, chemical resistance, high strength and storage stability.

As a result, column spacers for a liquid crystal display device are formed. The column spacers have a compressive displacement of about 0.4 to about 0.6 μm and an elastic recovery of about 80% or higher.

Hereinafter, the present invention will be explained in more detail with reference to the following examples. However, these examples are given for the purpose of illustration only and are not intended to limit the scope of the invention.

EXAMPLES

Synthesis Example 1

The following compounds are put into a separable flask equipped with a stirrer, a reflux condenser, a drying tube, a nitrogen inlet tube, a thermometer, a temperature-controllable circulator and the like:

| | |
|---|---|
| (1) Methacrylic acid | 25.2 g |
| (2) Benzyl methacrylate | 49.8 g |
| (3) Tricyclo[5.2.1.0$^{2,6}$]decan-7-yl methacrylate | 14.5 g |
| (4) Methyl methacrylate | 5 g |
| (5) Ethacrylonitrile | 5 g |
| (6) 2,2'-Azobis(2,4-dimethylvaleronitrile) | 10 g |
| (7) Propylene glycol monomethyl ether acetate | 208.76 g |

The flask is flushed with nitrogen to create a nitrogen atmosphere in the flask and immersed in an oil bath. The mixture is polymerized at a reaction temperature of 70° C. for 3 hours with stirring to give an alkali-soluble resin ('Copolymer 1').

Synthesis Example 2

0.01 g of acrylic acid and 0.5 g of a butadiene polymer ($M_w$=750) are added to 30 g of the copolymer prepared in Synthesis Example 1. The mixture is allowed to react at 90° C. for 3 hours to give a graft copolymer resin ('Graft resin 1') having a molecular weight of 13,000 and a dispersity of 3.2.

Synthesis Example 3

0.008 g of acrylic acid and 0.5 g of a butadiene polymer ($M_w$=1,000) are added to 30 g of the copolymer prepared in Synthesis Example 1. The mixture is allowed to react at 90° C. for 3 hours to give a graft copolymer resin ('Graft resin 2') having a molecular weight of 15,000 and a dispersity of 2.7.

Example 1

A photosensitive resin composition is prepared using the Graft resin 1 prepared in Synthesis Example 2 and the other components shown in Table 1:

TABLE 1

| | Components | Content (g) |
|---|---|---|
| Alkali-soluble resin | Graft resin 1 | 15.8* |
| Reactive unsaturated compound | Dipentaerythritol hexaacrylate | 15.8 |
| Photoinitiator | IGR 369 (Ciba-Geigy) | 3.95 |
| Solvent | Propylene glycol methyl ether acetate | 44.7 |
| | Diethylene glycol ethyl methyl ether | 18.96 |
| Additive | γ-Glycidoxypropyltrimethoxysilane (S-510, Chisso) | 0.79 |

Note:
*The content of copolymer 1 was on the basis of solids content.

Example 2

A resin composition is prepared in the same manner as in Example 1, except that 15.8 g of Copolymer 2 prepared in Synthesis Example 2 is used as the alkali-soluble resin.

Comparative Example 1

A resin composition is prepared in the same manner as in Example 1, except that 15.8 g of butadiene/styrene/methacrylic acid/dicyclopentanyl methacrylate/glycidyl methacrylate ($M_w$=19,800, KRBP-3, Wako, Japan) is used as the alkali-soluble resin.

Comparative Example 2

A resin composition is prepared in the same manner as in Example 1, except that 15.8 g of butadiene/styrene/methacrylic acid/dicyclopentanyl methacrylate/glycidyl methacrylate ($M_w$=26,500, KRBP-3, Wako, Japan) is used as the alkali-soluble resin.

Formation and Evaluation of Physical Properties of Spacer Patterns (1) Formation of Spacer Patterns Each of the photosensitive resin compositions prepared in Examples 1 and 2 and Comparative Examples 1 and 2 is applied to a glass substrate using a spin coater and dried at 80° C. for 90 seconds to form a coating film. The coating film is irradiated with light of a wavelength of 365 nm at a dose of 100 mJ/cm$^2$ through a patterned mask. Subsequently, the exposed film is developed with a dilute aqueous solution of potassium hydroxide (1 wt %) at 23° C. for one minute and cleaned with pure water for one minute to remove unnecessary portions and leave a spacer pattern only. The spacer pattern is cured in an oven at 220° C. for 30 minutes to form a final column spacer pattern.

(2) Evaluation of Physical Properties of Patterns (i) Measurement of Compressive Displacement and Elastic Recovery Spacers are formed using each of the photosensitive resin compositions. The spacers are processed to have basic dimensions for the measurement of the mechanical properties, i.e. compressive displacement and elastic recovery, of the spacers. The compressive displacement and elastic recovery of the spacers are measured using a microhardness tester (H-100, Fischer GmbH, Germany) under the following conditions.

The patterns are pressurized using a planar indenter having a diameter of 50 μm. A load-unload process is employed to measure the compressive displacement and elastic recovery of the patterns. At this time, the patterns are pressurized under a test load of 5 gf at a loading speed of 0.45 gf/s for a holding time of 3 seconds.

The compressive displacement and elastic recovery of a column spacer formed using the photosensitive resin composition of the present invention will be explained below with reference to FIG. 1.

A spacer 20 having a uniform thickness (T) is formed by patterning ($S_0$). The spacer is pressed using a substrate, such as an array substrate, to decrease its thickness ($S_1$). At this time, the compressive displacement of the spacer refers to an indentation depth ($D_1$) of the pattern when a constant force is applied to the spacer, as shown in FIG. 1. When the compressive force (F) is removed, the thickness of the spacer is increased by a restoration force ($S_2$). The difference in thickness, i.e. between the initial thickness before the spacer is pressurized and the thickness after the spacer is restored, is expressed as $D_2$. This relationship is shown in FIG. 2.

The elastic recovery of the spacer can be understood as follows. That is, as shown in FIG. 1, when a constant force is applied, the elastic recovery of the spacer refers to the ratio of a difference ($D_1-D_2$) between the indentation depth ($D_1$) and the restored depth ($D_2$) to the indentation depth ($D_1$). The compressive displacement and the elastic recovery of the spacer are summarized by the following equations:

Compressive displacement(μm)=$D_1$

Elastic recovery=$[(D_1-D_2)\times100]/D_1$

The results for the physical properties of the column spacer patterns formed using the respective compositions are set forth in Table 2.

TABLE 2

| Example No. | Compressive displacement (μm) | Recovery rate (%) |
| --- | --- | --- |
| Example 1 | 0.58 | 82.3 |
| Example 2 | 0.55 | 87.2 |
| Comparative Example 1 | 0.53 | 75.9 |
| Comparative Example 2 | 0.48 | 78.6 |

The results of Table 2 demonstrate that the spacers formed using the respective photosensitive resin compositions prepared in Examples 1 and 2 showed higher compressive displacement and higher recovery rate than those formed using the photosensitive resin compositions prepared in Comparative Examples 1 and 2.

As apparent from the above description, the photosensitive resin composition of the present invention can be used to form column spacers that show improved after pattern thickness uniformity, high sensitivity, good developability without leaving any residual image, superior solvent resistance and high recovery rate.

In addition, spacers formed using the photosensitive resin composition of the present invention can be used to maintain a constant cell gap, irrespective of the size of a liquid crystal display device, and to prevent a variation in cell gap arising from movement or vibration of liquid crystal panels or impact on liquid crystal panels. Particularly, spacers formed using the photosensitive resin composition of the present invention have very high strength. Therefore, liquid crystal display devices employing the high-strength spacers can protect the spacers and underlying structures from being destroyed by an externally applied impact.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A photosensitive resin composition useful for forming column spacers for a liquid crystal display device, the composition comprising an alkali-soluble resin, a reactive unsaturated compound, a photoinitiator and a solvent, wherein the alkali-soluble resin is a copolymer comprising structural units represented by Formulae 1, 2 and 3:

(1)

wherein $R_1$ and $R_2$ are each independently a hydrogen atom or a $C_1$-$C_6$ alkyl group and n represents the weight ratio of the structural unit to the copolymer;

(2)

wherein $R_1$ and $R_2$ are each independently a hydrogen atom or a $C_1$-$C_6$ alkyl group, $R_3$ is selected from $C_1$-$C_{12}$ alkyl, hydroxyalkyl, amide- or urea-containing alkyl, alkenyl, $C_5$-$C_{12}$ cycloalkyl which is optionally substituted with a group selected from methyl or $C_1$-$C_4$ oxyalkyl, aromatic hydrocarbon and polycyclic alkyl groups, and n represents the weight ratio of the structural unit to the copolymer; and

(3)

wherein $R_1$ and $R_2$ are each independently a hydrogen atom or a $C_1$-$C_6$ alkyl group, $R_4$ is a linear dienic polymer having unsaturated double bonds, and n represents the weight ratio of the structural unit to the copolymer.

2. The photosensitive resin composition according to claim 1, wherein the alkali-soluble resin comprises about 10 to about 60% by weight of the structural unit of Formula 1, about 20 to about 60% by weight of the structural unit of Formula 2, and about 3 to about 20% by weight of the structural unit of Formula 3.

3. The photosensitive resin composition according to claim 1, wherein the alkali-soluble resin further comprises a structural unit derived from a styrene compound selected from the group consisting of styrene, α-methylstyrene, m-methylstyrene, p-methylstyrene, vinyltoluene, p-methoxystyrene, p-tert-butoxystyrene, and mixtures thereof.

4. The photosensitive resin composition according to claim 1, wherein the composition comprises about 5 to about 50% by weight of the alkali-soluble resin, about 1 to about 50% by weight of the reactive unsaturated compound, about 0.5 to about 15% by weight of the photoinitiator, and the balance of the solvent.

5. The photosensitive resin composition according to claim 1, wherein the alkali-soluble resin is a graft copolymer.

6. The photosensitive resin composition according to claim 1, wherein the alkali-soluble resin has a structure of Formula 4:

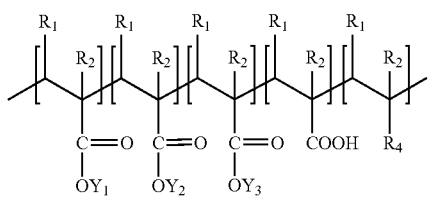

wherein $R_1$ and $R_2$ are each independently a hydrogen atom or a $C_1$-$C_6$ alkyl group, $Y_1$ is a $C_1$-$C_{12}$ alkyl group, a hydroxyalkyl group, an amide- or urea-containing alkyl group, or an alkenyl group; $Y_2$ is a $C_5$-$C_{12}$ cycloalkyl group optionally substituted with a group selected from methyl or $C_1$-$C_4$ oxyalkyl or an aromatic hydrocarbon group selected from benzene, phenyl or naphthyl group, $Y_3$ is a polycyclic alkyl group, and $R_4$ is a linear dienic polymer having unsaturated double bonds.

7. The photosensitive resin composition according to claim 1, wherein the alkali-soluble resin has a dispersity of between about 1.2 and about 5.

8. The photosensitive resin composition according to claim 1, further comprising a silane coupling agent in an amount of about 0.001 to about 20 parts by weight, based on 100 parts by weight of the alkali-soluble resin.

9. A column spacer for a liquid crystal display device which is formed using a photosensitive resin composition comprising an alkali-soluble resin, a reactive unsaturated compound, a photoinitiator and a solvent, wherein the alkali-soluble resin is a copolymer comprising structural units represented by Formulae 1, 2 and 3:

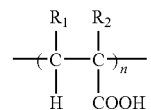

wherein $R_1$ and $R_2$ are each independently a hydrogen atom or a $C_1$-$C_6$ alkyl group and n represents the weight ratio of the structural unit to the copolymer;

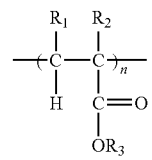

wherein $R_1$ and $R_2$ are each independently a hydrogen atom or a $C_1$-$C_6$ alkyl group, $R_3$ is selected from $C_1$-$C_{12}$ alkyl, hydroxyalkyl, amide- or urea-containing alkyl, alkenyl, $C_5$-$C_{12}$ cycloalkyl which is optionally substituted with a group selected from methyl or $C_1$-$C_4$ oxyalkyl, aromatic hydrocarbon and polycyclic alkyl groups, and n represents the weight ratio of the structural unit to the copolymer; and

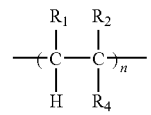

wherein $R_1$ and $R_2$ are each independently a hydrogen atom or a $C_1$-$C_6$ alkyl group, $R_4$ is a linear dienic polymer having unsaturated double bonds, and n represents the weight ratio of the structural unit to the copolymer.

10. The column spacer according to claim 9, wherein the column spacer has a compressive displacement of about 0.4 to about 0.6 μm and an elastic recovery of about 80% or higher.

11. A display device comprising a column spacer formed using a photosensitive resin composition comprising an alkali-soluble resin, a reactive unsaturated compound, a photoinitiator and a solvent, wherein the alkali-soluble resin is a copolymer comprising structural units represented by Formulae 1, 2 and 3:

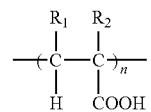

wherein $R_1$ and $R_2$ are each independently a hydrogen atom or a $C_1$-$C_6$ alkyl group and n represents the weight ratio of the structural unit to the copolymer;

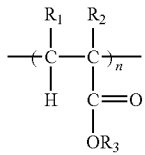

(2)

wherein $R_1$ and $R_2$ are each independently a hydrogen atom or a $C_1$-$C_6$ alkyl group, $R_3$ is selected from $C_1$-$C_{12}$ alkyl, hydroxyalkyl, amide- or urea-containing alkyl, alkenyl, $C_5$-$C_{12}$ cycloalkyl which is optionally substituted with a group selected from methyl or $C_1$-$C_4$ oxyalkyl, aromatic hydrocarbon and polycyclic alkyl groups, and n represents the weight ratio of the structural unit to the copolymer; and

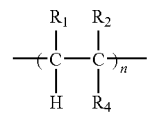

(3)

wherein $R_1$ and $R_2$ are each independently a hydrogen atom or a $C_1$-$C_6$ alkyl group, $R_4$ is a linear dienic polymer having unsaturated double bonds, and n represents the weight ratio of the structural unit to the copolymer.

* * * * *